(No Model.)

J. BOOTH.
CAR COUPLING.

No. 354,301. Patented Dec. 14, 1886.

Witnesses
C. M. Mason.
J. C. Grout.

Inventor
Joseph Booth
by Geo. N. Lothrop,
his Atty.

UNITED STATES PATENT OFFICE.

JOSEPH BOOTH, OF DETROIT, MICHIGAN, ASSIGNOR TO THE AIKMAN AUTOMATIC CAR COUPLER COMPANY, OF SAME PLACE.

CAR-COUPLING.

SPECIFICATION forming part of Letters Patent No. 354,301, dated December 14, 1886.

Application filed July 9, 1886. Serial No. 207,578. (No model.)

*To all whom it may concern:*

Be it known that I, JOSEPH BOOTH, of Detroit, in the county of Wayne and State of Michigan, have invented a new and useful Improvement in Car Couplings, of which the following is a specification.

My invention consists of an improvement in car-couplings, relating to means for locking a coupling-hook of the kind shown in Patent No. 343,528, to Peter A. Aikman, hereinafter fully described.

Figure 1:
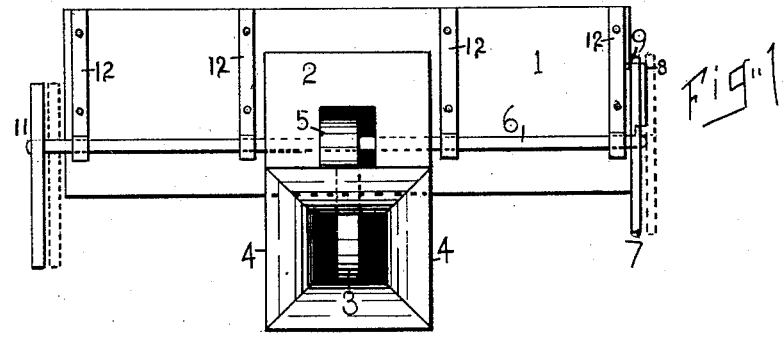
Figure 2:
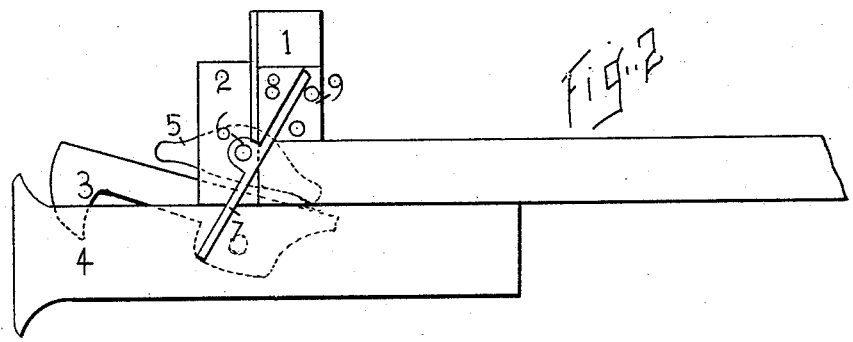
Figure 4:
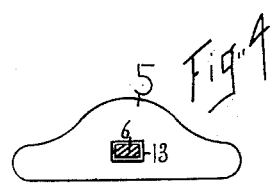
Figure 3:
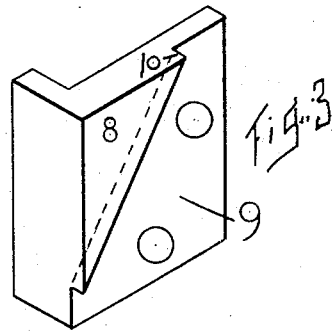

Figure 1 is an end elevation; Fig. 2, a side elevation; Fig. 3, a perspective of the locking-plate; and Fig. 4, a detailed view of the cam and the connection of the rock-shaft therewith.

1 represents the end of the car. 2 represents the dead wood. 4 represents a draw-bar; 3, a pivoted coupling-hook lying in a slot in said draw-bar; and 5, a double cam, by which said coupling-hook may be raised or lowered, these devices being all substantially the same as in the patent of said Aikman, above referred to.

6 represents a rock-shaft loosely journaled in brackets 12 12 on the front of the car, and passing through a rectangular hole, 13, in the cam 5. That part of the rock-shaft 6 which passes through the hole in cam 5 is squared to fit loosely in said hole, so that the rock-shaft will slide freely in said cam, but will not turn thereon.

7 11 represent levers secured to the ends of rock-shaft 6.

9 represents a plate secured to the corner of the car-body by screws or bolts, as indicated in Figs. 2 and 3, and having an offset, 8, thereon, by which means the projecting shoulder 10 or stop is obtained.

When the rock-shaft lies in the position shown in dotted lines in Fig. 1, it can be freely rocked by means of either of the levers 7 11, and the cam 5 thereby actuated to hold the coupling-hook 3 either raised or lowered, as in the patent of said Aikman. When it is desired to hold the coupling-hook raised, the rock-shaft 6 is rocked by either of the levers, and when the hook is raised the rock-shaft is slid to the left, Fig. 1, until the upper arm of lever 7 lies behind the projecting shoulder 10 on plate 9, and said shoulder holds said lever and retains the coupling-hook in an elevated position, as shown in Fig. 2.

To lock the coupling-hook in a depressed position rock-shaft 6 is moved to the left, Fig. 1, until the upper end of lever 7 lies in front of the end of plate 9. This device does away with the pin and holes in the side of the car used to lock the rock-shaft levers at different points, for the purpose of holding the coupling-hook raised or lowered.

I have shown the hole in the cam as squared, and that part of the rock-shaft which engages therewith as squared, as this is a convenient mode of attaching the cam to the rock-shaft, so that the shaft will slide freely through and will not turn in the cam; but I do not confine myself to this mode, as there are many other known modes of accomplishing the same result—as, for instance, the common slot and feather.

What I claim as my invention, and desire to secure by Letters Patent, is—

1. In combination with a pivoted coupling-hook, a double cam suspended over said hook, a rock-shaft passing through said cam, and adapted to slide but not to turn thereon, a lever on the end of the rock-shaft, and a stop rigidly secured to the side of the car, substantially as shown and described.

2. In combination with the cam 5, having therein the hole 13, the rock-shaft 6, squared on a portion of its length to engage loosely with hole 13, lever 7, and the plate 9, having the offset 8, with the projecting stop 10, substantially as shown and described.

JOSEPH BOOTH.

Witnesses:
SUMNER COLLINS,
GEO. H. LOTHROP.